(12) United States Patent
Mugishima et al.

(10) Patent No.: US 11,177,496 B2
(45) Date of Patent: Nov. 16, 2021

(54) MANUFACTURING METHOD OF FUEL CELL, AND FUEL CELL

(71) Applicant: Honda Motor Co.,Ltd., Tokyo (JP)

(72) Inventors: Takehiro Mugishima, Tochigi (JP); Akio Fujimoto, Tochigi (JP); Hitoshi Nagasaki, Tochigi (JP)

(73) Assignee: Honda Motor Co., Ltd., Tokyo (JP)

( * ) Notice: Subject to any disclaimer, the term of this patent is extended or adjusted under 35 U.S.C. 154(b) by 108 days.

(21) Appl. No.: 16/792,887

(22) Filed: Feb. 18, 2020

(65) Prior Publication Data

US 2020/0266471 A1   Aug. 20, 2020

(30) Foreign Application Priority Data

Feb. 19, 2019   (JP) .............................. JP2019-027741

(51) Int. Cl.
| | |
|---|---|
| *H01M 4/02* | (2006.01) |
| *H01M 8/1004* | (2016.01) |
| *H01M 4/88* | (2006.01) |
| *H01M 4/86* | (2006.01) |

(52) U.S. Cl.
CPC ....... *H01M 8/1004* (2013.01); *H01M 4/8626* (2013.01); *H01M 4/881* (2013.01); *H01M 4/8807* (2013.01); *H01M 2300/0094* (2013.01)

(58) Field of Classification Search
CPC ..................................................... H01M 4/02
See application file for complete search history.

(56) References Cited

U.S. PATENT DOCUMENTS

2011/0171554 A1*   7/2011   Hayashi .............. H01M 8/0273
429/456

FOREIGN PATENT DOCUMENTS

| JP | 2001273914 | 10/2001 |
|---|---|---|
| JP | 2011054301 | 3/2011 |
| JP | 2011204609 | 10/2011 |
| JP | 2012015093 | 1/2012 |
| JP | 2018124039 | 8/2018 |
| WO | 2017047343 | 3/2017 |

OTHER PUBLICATIONS

"Office Action of Japan Counterpart Application", dated Oct. 27, 2020, with English translation thereof, pp. 1-4.

* cited by examiner

*Primary Examiner* — Jacob B Marks
(74) *Attorney, Agent, or Firm* — JCIPRNET

(57) ABSTRACT

A manufacturing method of fuel cell and a fuel cell are provided. The manufacturing method of fuel cell includes a first slit formation process in which first slits are formed in a first electrode, an electrolyte membrane lamination process in which an electrolyte membrane is laminated on the first electrode, an IC formation process in which interconnector portions are formed on the electrolyte membrane, a second slit formation process in which second slits are formed in a second electrode, a second electrode lamination process in which the second electrode is laminated on the electrolyte membrane, and a side edge portion removal process in which side edge portions of the first electrode and the second electrode are removed to divide the first electrode into a plurality of parts via the first slits and to divide the second electrode into a plurality of parts via the second slits.

8 Claims, 10 Drawing Sheets

MANUFACTURING METHOD OF FUEL CELL, AND FUEL CELL

CROSS-REFERENCE TO RELATED APPLICATIONS

This application claims the priority benefit of Japanese Patent Application No. 2019-027741, filed on Feb. 19, 2019. The entirety of the above-mentioned patent application is hereby incorporated by reference herein and made a part of this specification.

BACKGROUND OF THE DISCLOSURE

Technical Field

The disclosure relates to a manufacturing method of fuel cell, and a fuel cell.

Related Art

A fuel cell is a device for obtaining electric power from hydrogen and oxygen. In recent years, the fuel cell has attracted attention as a clean electric power source because only water is generated with power generation. Because a voltage of unit cells of this fuel cell is as low as 0.6-0.8 V, a fuel cell stack is put into practical use in which a plurality of the unit cells consisting of membrane-electrode assemblies (MEA) and separators are laminated and connected in series to obtain high output. The fuel cell stack has a problem of taking a lot of time and effort because many work processes are required in lamination.

On the other hand, a fuel cell is known in which a plurality of unit cells are formed in a plane shape on one piece of an electrolyte membrane, interconnector portions for connecting adjacent unit cells with each other are formed, and the plurality of unit cells are connected in series (for example, see patent literature 1). In this configuration, there is a merit that voltage can be increased with one piece of electrolyte membrane, and work of laminating unit cells can be eliminated or reduced.

LITERATURE OF RELATED ART

Patent Literature

Patent literature 1: International Publication No. 2018/124039

In a conventional manufacturing method of fuel cell, first, a comparatively low-temperature laser beam is irradiated, then, a comparatively high-temperature laser beam is irradiated, and the temperature is gradually raised to form appropriate interconnector portions.

In addition, in patent literature 1, it is also proposed to form interconnector portions by controlling an output irradiation intensity and a feed speed (a moving speed) using one laser oscillator. However, in order to form appropriate interconnector portions, it is necessary to control the output irradiation intensity and the feed speed (the moving speed) with high precision, and it is hard to manufacture a fuel cell with a cheap device.

SUMMARY

The disclosure is a method for manufacturing a fuel cell (for example, a fuel cell 10 of the embodiment, the same applies hereinafter) including a first electrode (for example, a first electrode 161 of the embodiment, the same applies hereinafter) in which first slits (for example, first slits 161a of the embodiment, the same applies hereinafter) are formed and a second electrode (for example, a second electrode 162 of the embodiment, the same applies hereinafter) in which second slits (for example, second slits 162a of the embodiment, the same applies hereinafter) are formed, the method including:

a slit formation process in which slits are formed in any one of the first electrode and the second electrode;

an electrolyte membrane lamination process in which an electrolyte membrane (for example, an electrolyte membrane 12 of the embodiment, the same applies hereinafter) is laminated on the one electrode;

an interconnector (IC) formation process in which interconnector portions (for example, interconnector portions 30 of the embodiment, the same applies hereinafter) are formed on the electrolyte membrane;

an electrode lamination process in which the other one of the first electrode and the second electrode in which the slits are formed is laminated on the electrolyte membrane so that the electrolyte membrane is sandwiched between the first electrode and the second electrode; and a side edge portion removal process in which side edge portions of the first electrode and the second electrode are removed to divide the first electrode into a plurality of parts via the first slits and to divide the second electrode into a plurality of parts via the second slits.

DESCRIPTION OF THE EMBODIMENTS

An embodiment of the disclosure is more specifically described below with reference to the drawings.

<Fuel Cell>

Figure 1:
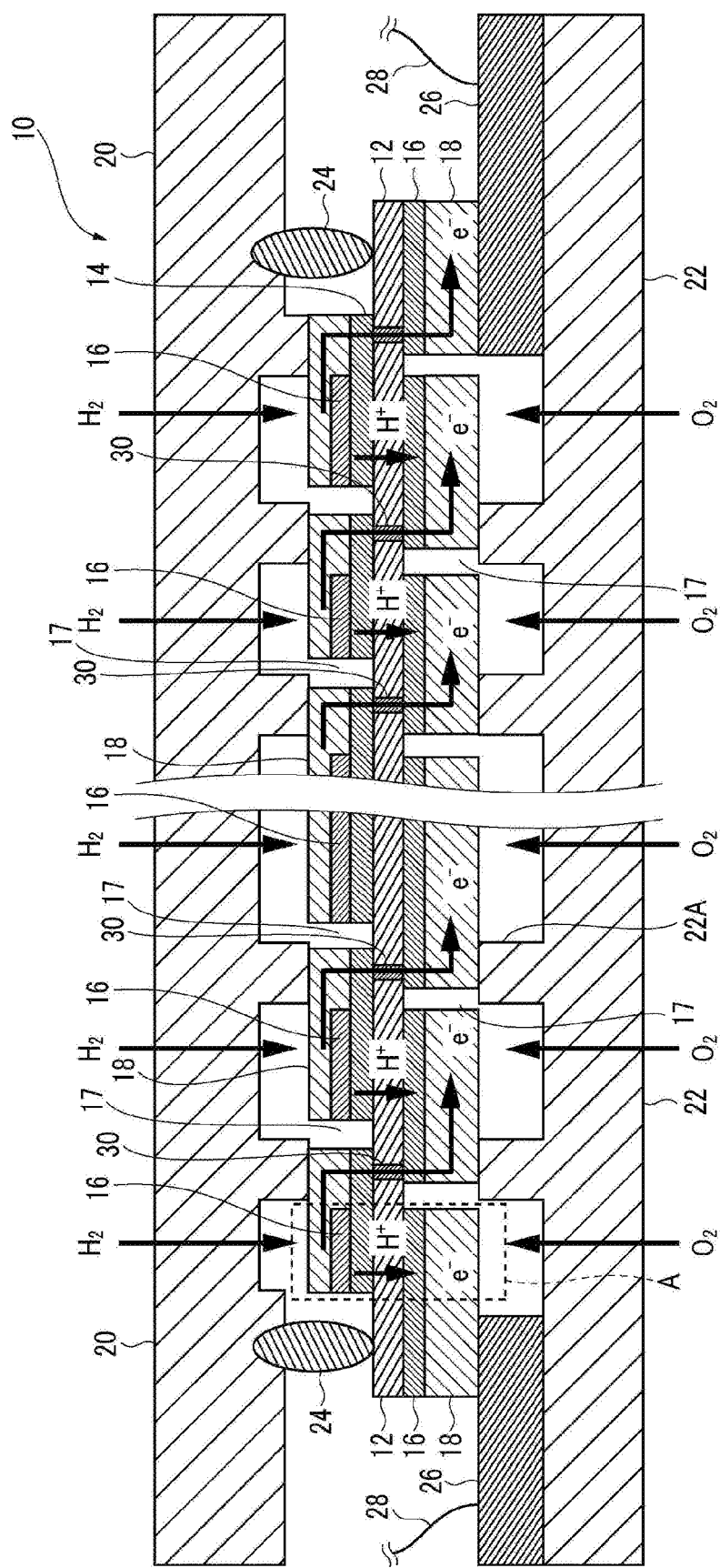
FIG. 1 is a schematic cross-section view showing a fuel cell of an embodiment to which the disclosure is applied.
Figure 2:
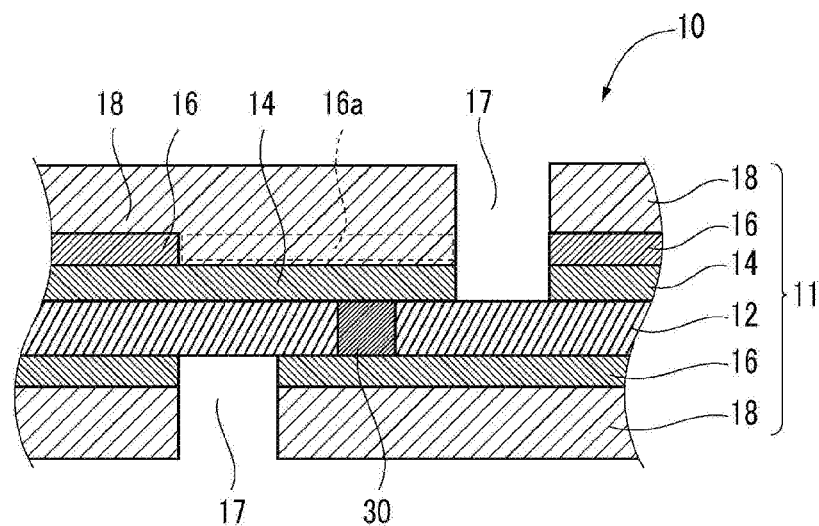
FIG. 2 is a schematic cross-section view showing enlarged main portions of the fuel cell of the embodiment.

FIG. 1 is a schematic cross-section view showing one embodiment of a fuel cell to which the disclosure is applied, and FIG. 2 is a view showing enlarged main portions of FIG. 1 in which an upper side is an anode and a lower side is a cathode. A membrane-electrode assembly (MEA) 11 of a fuel cell 10 shown in FIG. 1 and FIG. 2 includes gas diffusion layers 18 on both sides of an electrolyte membrane 12, a catalyst layer 16 is arranged as an electrode layer on a lower side, and on an upper side, the catalyst layer 16 serving as an electrode layer and a protective layer 14 in contact with the electrolyte membrane 12 are arranged. That is, in the embodiment, an electrode layer of the upper side is configured by two layers, namely, the catalyst layer 16 and the protective layer 14. Furthermore, an upper plate 20 is arranged above the gas diffusion layer 18 on the upper side, and a lower plate 22 is arranged below the gas diffusion layer on the lower side. The upper plate 20 and the lower plate 22 form a pressing member which presses the MEA 11 with a predetermined pressure. Furthermore, in FIG. 1, a lamination structure positioned in the centre is omitted.

Channel grooves (concave portions in the view) for hydrogen gas and oxygen-containing gas (the air) are arranged on surfaces of each of the upper plate 20 and the lower plate 22, the surfaces being on a side of the gas diffusion layers 18. A seal 24 is arranged between a peripheral edge portion of an upper surface (an anode side) of the electrolyte membrane 12 and the upper plate 20. The seal 24 is in contact with the electrolyte membrane 12 and the upper plate 20 and seals a space between the upper plate 20 and the electrolyte membrane 12. Furthermore, in the upper plate 20, a hydrogen introduction port not shown is arranged, and the hydrogen introduction port is used for introducing hydrogen supplied from a hydrogen supply part not shown to the space between the upper plate 20 and the electrolyte membrane 12. On the other hand, a lower surface (a cathode side) of the electrolyte membrane 12 is not sealed as the upper surface, and has a structure for taking in oxygen from the surrounding air.

In addition, on the lower surface (the cathode side) of the electrolyte membrane 12, graphite sheets 26 are arranged between the gas diffusion layer 18 and the lower plate 22 on lower surfaces of both end portions (a left end and a right end in FIG. 1) of the MEA 11, and the graphite sheets 26 are in contact with the gas diffusion layers 18. Conducting wires 28 are connected to each of the graphite sheets 26, and electric power generated by the fuel cell 10 is taken out through the conducting wires 28. Furthermore, the electrolyte membrane 12, and the catalyst layer 16 and the gas diffusion layer 18 on the lower surface side of the electrolyte membrane 12 are sandwiched in a state of being pressed by the upper plate 20 and the lower plate 22 with a fixed pressure.

The protective layer 14, the catalyst layer 16, and the gas diffusion layer 18 on the upper surface side of the electrolyte membrane 12 and the catalyst layer 16 and the gas diffusion layer 18 on the lower surface side of the electrolyte membrane 12 are divided by a plurality of dividing grooves 17, and a plurality of regions (hereinafter, referred to as the "electrode regions") are formed. These electrode regions have a rectangular shape in which an extension direction of the dividing groove 17 is a long side and a short side is between two dividing grooves. In addition, the electrode regions on the upper surface side of the electrolyte membrane 12 are arranged to face the electrode regions on the lower surfaces.

In the MEA 11, a unit cell (a power generation cell) is configured by a lamination structure including one electrode region on the upper surface side of the electrolyte membrane 12, the electrode region on the lower surface side facing a part of the one electrode region, and the electrolyte membrane 12 positioned between these electrode regions. That is, in FIG. 1, the lamination structure consisting of the electrolyte membrane 12, the protective layer 14, the catalyst layer 16, and the gas diffusion layer 18 on the upper surface side of the electrolyte membrane 12, and the catalyst layer 16 and the gas diffusion layer 18 on the lower surface side is a unit cell. In FIG. 1, only a leftmost unit cell is indicated by a broken line L.

Inside the electrolyte membrane 12, there is an interconnector portion 30 which electrically connects the electrode region on an upper surface side of one unit cell and the electrode region on a lower surface side of a unit cell next to the one unit cell. Adjacent unit cells are electrically connected in series with each other by the interconnector portions 30.

In FIG. 1 and FIG. 2, a width of each electrode region (a length between two dividing grooves 17) can be set to, for example, about 5 mm, a width of the interconnector portion 30 can be set to about 0.1 mm, and a width of the dividing groove 17 can be set to 0.2 mm.

As described above, the electrolyte membrane 12 and the catalyst layer 16 and the gas diffusion layer 18 on the lower surface side of the electrolyte membrane 12 are sandwiched in the state of being pressed by the upper plate 20 and the lower plate 22 with a fixed pressure. In the upper plate 20 and the lower plate 22, as shown in FIG. 1, protruding portions 20A of the upper plate 20 and protruding portions 22A of the lower plate 22 are respectively located at facing positions and are formed to sandwich the interconnector portions 30. By the protruding portions 20A and 22A, the electrode layers on the upper side and on the lower side are pressed to the interconnector portions 30, and contact between these electrode layers and the interconnector portions 30 is more reliably maintained. Therefore, conduction of the electrode layers on the upper side and the electrode layers on the lower side is further ensured.

Here, from a viewpoint of applying sufficient pressure to the interconnector portions 30, a width of the protruding portions 20A and a width of the protruding portions 22A are preferably equal to or greater than the width of the interconnector portions 30 and equal to or smaller than the interval between adjacent unit cells.

As described above, the MEA 11 is pressed by the upper plate 20 and the lower plate 22; however, the means to press may be that through holes penetrating the upper plate 20 and the lower plate 22 are arranged and bolts pass through the through holes to be tightened with nuts (the tightening is performed at multiple places), or tightening by clamping, or the like.

In the above configuration, power is generated in each unit cell by supplying the hydrogen gas to the anode side and supplying the oxygen-containing gas (the air) to the cathode side, and the electric power can be taken out through the conducting wires 28 connected to two graphite sheets 26. Besides, because the unit cells are connected in series, a sum of a voltage of each unit cell is a voltage of the fuel cell 10.

The above structural components of the fuel cell according to the embodiment of the disclosure are specifically described below.

[Electrolyte Membrane]

The electrolyte membrane in the fuel cell of the disclosure is not particularly limited, and various electrolyte membranes can be employed. Besides, as described above, inside the electrolyte membrane, the interconnector portions for electrically connecting adjacent unit cells in series with each other are included. The interconnector portions are formed by locally heating and carbonizing the electrolyte membrane as described latter.

A proton conductive resin of the electrolyte membrane is preferably an aromatic polymer compound such as aromatic polyarylene ether ketones or aromatic polyarylene ether sulfones in which a sulfonic acid group is introduced into a hydrocarbon polymer. The reason is that the interconnector portions can be easily formed by carbonization compared with perfluorosulfonic acid resin such as Nafion (registered trademark). Although the reason is uncertain, it is considered that the aromatic polymer is easily graphitized by thermal decomposition because the aromatic polymer contains a carbon ring structure of six members in a molecular structure. This aromatic polymer is changed into a conductive carbide by, for example, being heated at about 900° C.

[Catalyst Layer]

The catalyst layer includes, for example, carbon particles (catalyst particles) carrying a catalyst metal. Carbon black can be used as the carbon particles. In addition, for example, graphite, carbon fibre, activated carbon, or the like, pulverized products thereof, or carbon compounds such as carbon nanofibers and carbon nanotubes can be employed as the carbon particles. On the other hand, as the catalyst metal, metal such as platinum, ruthenium, iridium, rhodium, palladium, osmium, tungsten, lead, iron, chromium, cobalt, nickel, manganese, vanadium, molybdenum, gallium, aluminium or the like can be used alone or in combination of two or more.

The catalyst layer includes a proton conductive resin in addition to the catalyst particles. The catalyst layer has a porous structure to increase a contact area with the hydrogen gas or the oxygen-containing gas. Therefore, a filling density of the proton conductive resin is set smaller than the protective layer described later. For example, the proton conductive resin may be 30-50 wt % of the catalyst layer.

On the other hand, when viewed from the lamination direction, the catalyst layer on the one surface does not overlap the catalyst layer on the other surface of an adjacent unit cell. In the fuel cell shown in FIG. 2, a catalyst layer 16 on an upper side (in FIG. 2, the catalyst layer on the left of the dividing groove 17 on the upper side) is formed not overlapping a catalyst layer 16 on a lower side of the adjacent unit cell (in FIG. 2, the catalyst layer on the right of the dividing groove 17 on the lower side).

A planar array fuel cell is a dead area where a region sandwiched by a dividing groove on one surface close to an interconnector portion and a dividing groove on the other surface (in FIG. 3, a region sandwiched by the dividing groove 17 on the upper side and the dividing groove 17 on the lower side) does not contribute to net electric power, and even in this region, an electrochemical reaction between the catalyst and hydrogen or oxygen may occur. However, because the electrode layers on both surfaces are short-circuited by the interconnector portions, the generated electrical energy is changed into heat. Then, there is a risk that excessive heat generation is caused in the fuel cell, and performance of the fuel cell is reduced. Therefore, the catalyst layer on one surface including the protective layer is made not to overlap the catalyst layer on the other surface of the adjacent unit cell when viewed from the lamination direction. Because the catalyst layer on the one surface does not overlap the catalyst layer on the other surface in a dead space, a reaction between the two catalyst layers in the dead space hardly occurs, and thus heat generation can be suppressed.

It is sufficient that, as shown in FIG. 2, the catalyst layer on the upper side and the catalyst layer on the lower side do not overlap when viewed from the lamination direction, and the catalyst layers may not formed on both the upper side and the lower side in the dead space. A reaction which does not contribute to the net electric power can be further suppressed, and a reduction in an amount of the catalyst is also achieved. In this case, the protective layer may also be formed on the lower side and conduction between the interconnector portions 30 and the catalyst layers is ensured.

Temperature changes in the dead space after power generation of the fuel cell of the embodiment starts are shown in table 1. Furthermore, in the table, in a fuel cell I, the catalyst layers on the upper side and the catalyst layers on the lower side overlap in the dead space, and in a fuel cell II, the catalyst layers on the upper side and the catalyst layers on the lower side do not overlap in the dead space.

TABLE 1

|  | At the start (0 second) | 120 seconds after starting |
| --- | --- | --- |
| Fuel cell I | 26° C. | 54° C. |
| Fuel cell II | 26° C. | 26° C. |

From the above table, the fuel cell I with overlapping catalyst layers generates heat and rises in temperature after the power generation. That is, useless electrochemical reactions have occurred. Furthermore, if the cathode side is open like the fuel cell of the embodiment, there is a risk that the electrolyte membrane may be dried due to this heat generation and power generation performance may be reduced. On the other hand, it can be seen that no temperature raise is observed in the fuel cell II in which the catalyst layers do not overlap. That is, the above useless electrochemical reactions are suppressed, and the drying of the electrolyte membrane is also suppressed.

[Protective Layer]

In order to prevent so-called cross leak in which gas leaks in or near the electrolyte membrane or the interconnector portions inside the electrolyte membrane, the protective layer is preferably arranged on one surface side or both surface sides of the electrolyte membrane. In FIG. 1, the protective layer is arranged on an upper surface side of the electrolyte membrane 12.

The protective layer may be of any form as long as it can prevent the cross leak, and is preferably a protective layer which has a gas barrier property and further has an electrical conductivity and a proton conductivity.

As one form of the above protective layer, the protective layer can be formed by a proton conductive resin and conductive carbon (carbon). In order to improve the gas barrier property, the filling density of the proton conductive resin is set higher than the filling density of the catalyst layer. For example, the proton conductive resin may be 70 wt % or more of the protective layer. Furthermore, the proton conductive resin may be a material the same as or different from the catalyst layer.

The perfluorosulfonic acid resin such as Nafion (registered trademark) or the like or the above aromatic polymer compound can be used as the proton conductive resin.

The conductive carbon may be carbon black, acetylene black, ketjen black or the like.

The above protective layer can be formed, for example, by coating and drying a coating solution prepared by adding the conductive carbon such as ketjen black or the like into a dispersion liquid of the proton conductive resin such as Nafion (registered trademark) or the like. Furthermore, a thickness of the protective layer may be, for example, 5-50 μm.

[Gas Diffusion Layer]

The gas diffusion layer is configured by laminating a base material and a porous layer. Carbon paper or carbon cloth can be used as the base material.

[Upper Plate and Lower Plate]

As described above, the upper plate 20 and the lower plate 22 include the channel grooves (the concave portions) for the gas on the side of the gas diffusion layer 18 and press the gas diffusion layer at portions (convex portions) between the channel grooves. The unit cells of the MEA 11 are connected in series with each other through the interconnector portions 30, and thus the upper plate 20 and the lower plate 22 are preferably formed by an insulating resin. The general-purpose resin may be polypropylene resin (PP), polyphenylene sulfide resin (PPS) or the like.

As described above, the upper plate 20 includes the protruding portions 20A and the lower plate 22 includes the protruding portions 22A. The protruding portions 20A and 22A are located at facing positions sandwiching the interconnector portions 30 in the fuel cell 10 and press the electrode layers on both surfaces of the MEA 11 to interconnector portions 30.

Furthermore, the pressure by the upper plate 20 and the lower plate 22 is preferably 5 MPa or less.

[Manufacturing Method of Fuel Cell]

The above fuel cell of the disclosure can be manufactured by a manufacturing method of the disclosure described below.

First, the carbon paper which is a raw material for the gas diffusion layer 18 is prepared. In order to form the catalyst layer 16 serving as a first electrode 161 on one surface of the carbon paper, an ink containing the catalyst and the proton conductive resin is coated. Furthermore, in order to form the protective layer 14 on the catalyst layer 16, an ink containing a conductive material (ketjen black or the like) and the proton conductive resin is coated on the catalyst layer 16 serving as the first electrode 161.

Figure 6:
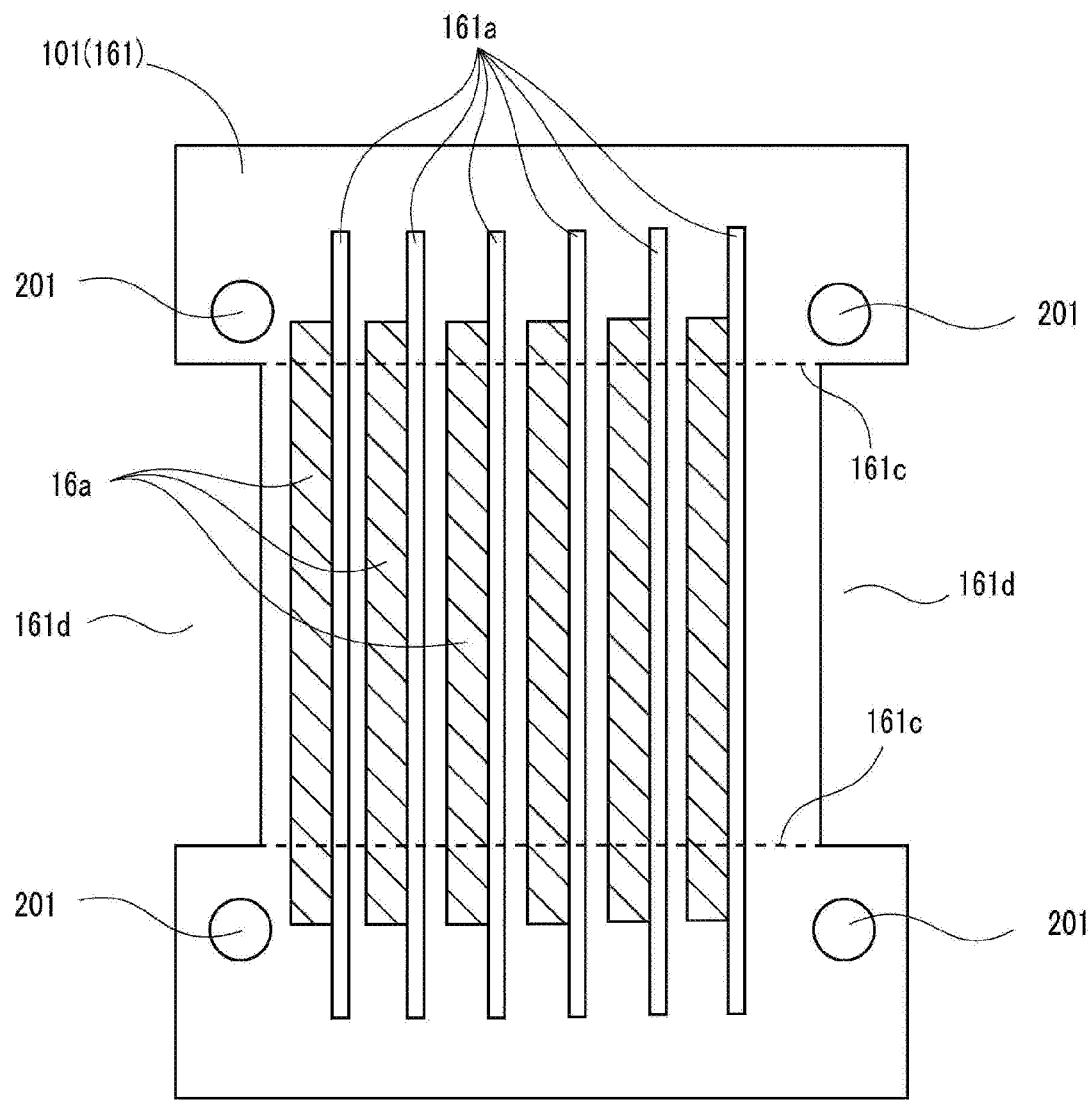
FIG. 6 is an illustration view showing a first slit formation process.

Then, as schematically shown in FIG. 6, a first lamination body (hereinafter, referred to as the "first diffusion electrode lamination body 101") of the gas diffusion layer 18 and the catalyst layer 16 serving as the first electrode layer which is made as described above is cut into a rectangular shape and the first positioning holes 201 for positioning are drilled at four corners. In the catalyst layer 16 serving as the first electrode layer, a plurality of removal portions 16a (see FIG. 2) in which the catalyst layer 16 is removed in a straight line by only partially irradiating the catalyst layer 16 with a laser while leaving the protective layer 14.

[First Slit Formation Process]

In addition, as schematically shown in FIG. 6, in a first slit formation process, in the first diffusion electrode lamination body 101, the first slits 161a which become the dividing grooves 17 between the electrode regions extending parallel to the removal portions 16a are formed adjacent the removal portions 16a. The first slits 161a can be formed by a method of mechanically removing the gas diffusion layer 18 and the catalyst layer 16 serving as the first electrode 161 in this portion using a needle-like blade or a method of irradiating a laser beam and evaporating this portion.

In addition, in order that unnecessary portions on both end sides of the first slits 161a of the first electrode 161 are easily removed later, two breakable lines 161c configured by a half cut or the like are arranged in a manner of crossing the first slits 161a and the removal portions 16a. In addition, on side edges of the first electrode 161, cut-out portions 161d which are positioned between the breakable lines 161c and cut out into a U-shape are arranged.

[Second Slit Formation Process]

Figure 7:
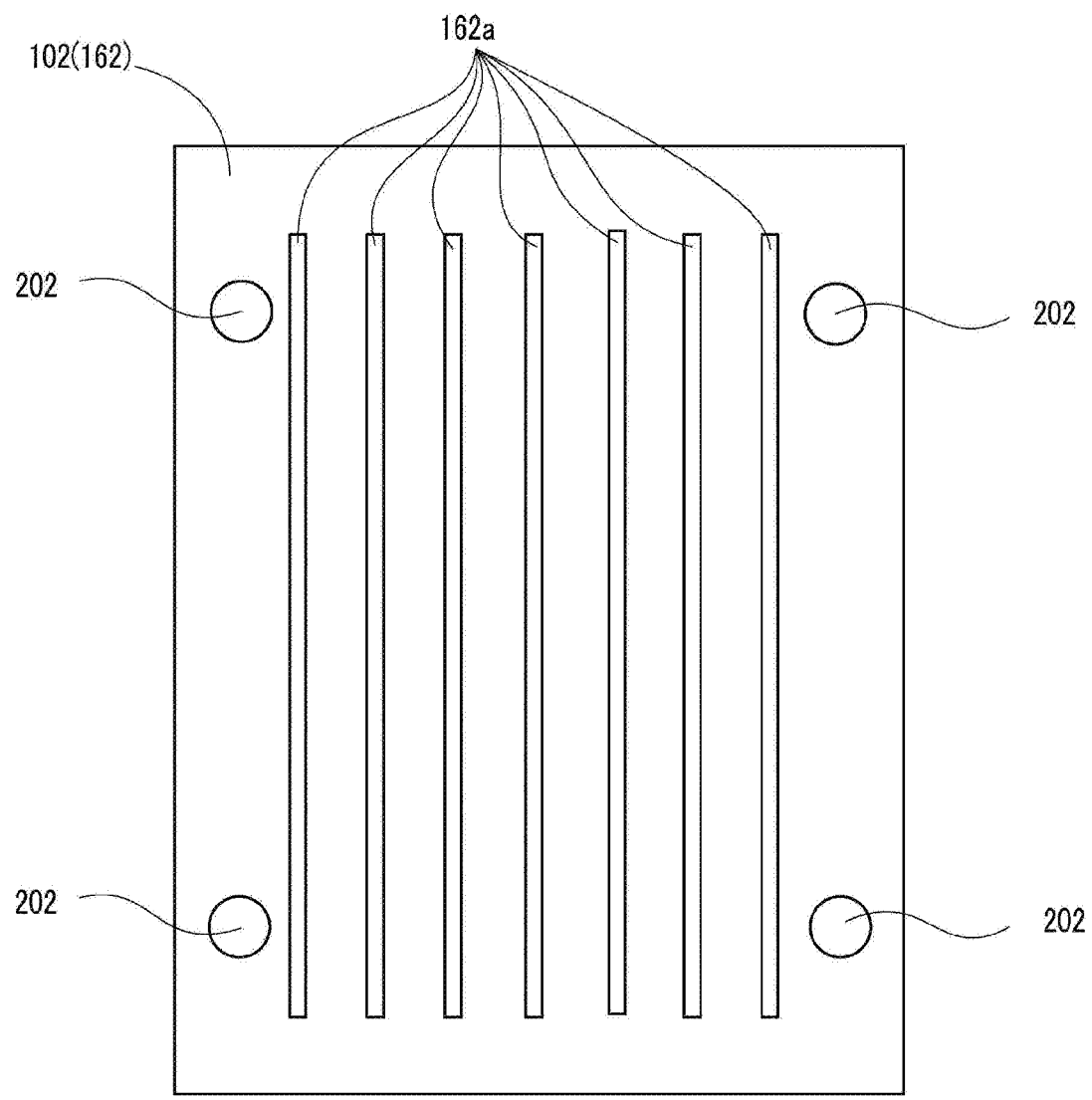
FIG. 7 is an illustration view showing a second slit formation process.

Next, in order to form a catalyst layer 16 serving as a second electrode 162 on one surface of the gas diffusion layer 18 consisting of the carbon paper, an ink containing the catalyst and the proton conductive resin is coated. Then, as schematically shown in FIG. 7, a second lamination body (hereinafter, referred to as the "second diffusion electrode lamination body 102") of the gas diffusion layer 18 and the catalyst layer 16 serving as the second electrode 162 is cut into a rectangular shape, and second positioning holes 202 which are set at intervals the same as the intervals of the first positioning holes 201 are drilled at four corners, and in a second slit formation process, the second slits 162a which become the dividing grooves 17 are formed.

[Electrolyte Membrane Lamination Process]

Figure 8:
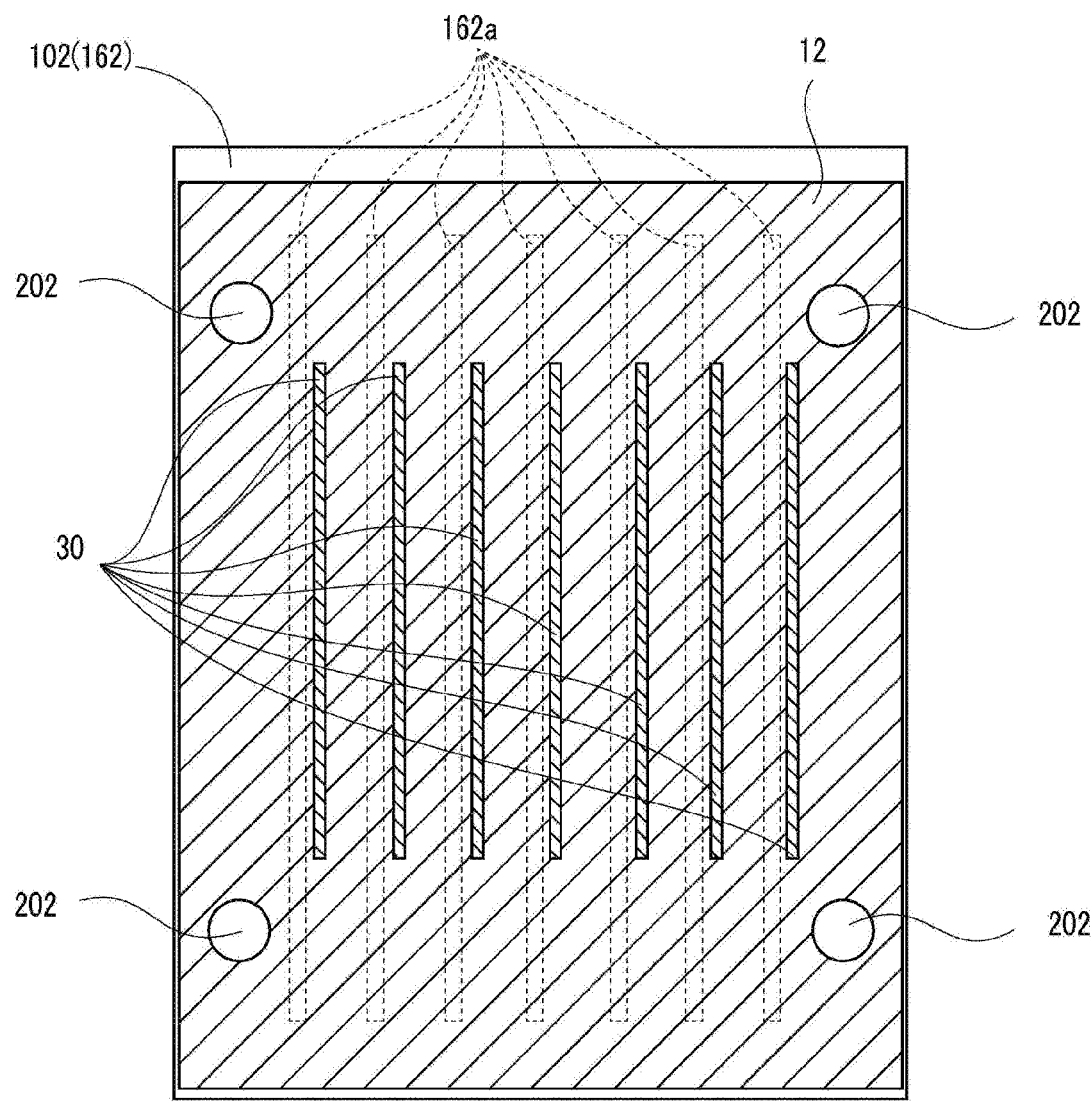
FIG. 8 is an illustration view showing an electrolyte membrane lamination process and an IC formation process.

Next, as schematically shown in FIG. 8, in an electrolyte membrane lamination process, the electrolyte membrane 12 is placed on the second diffusion electrode lamination body 102 in which the second slits 162a which become the dividing grooves 17 are formed. In FIG. 8, the electrolyte membrane 12 is indicated by oblique lines.

Furthermore, in the embodiment, a method of laminating the electrolyte membrane 12 on the second diffusion electrode lamination body 102 having the second electrode 162 is described, and the electrolyte membrane 12 may be laminated on the first diffusion electrode lamination body 101 having the first electrode 161.

[IC Formation Process]

Then, as schematically shown in FIG. 8, in an IC formation process, places in which the interconnector portions 30 of the electrolyte membrane 12 are to be formed are locally heated, and the interconnector portions 30 are formed in the electrolyte membrane 12. The means thereof may be laser beam irradiation. A laser beam source to be used may be, for example, a $CO_2$ laser.

[Electrode Lamination Process]

Figure 9:
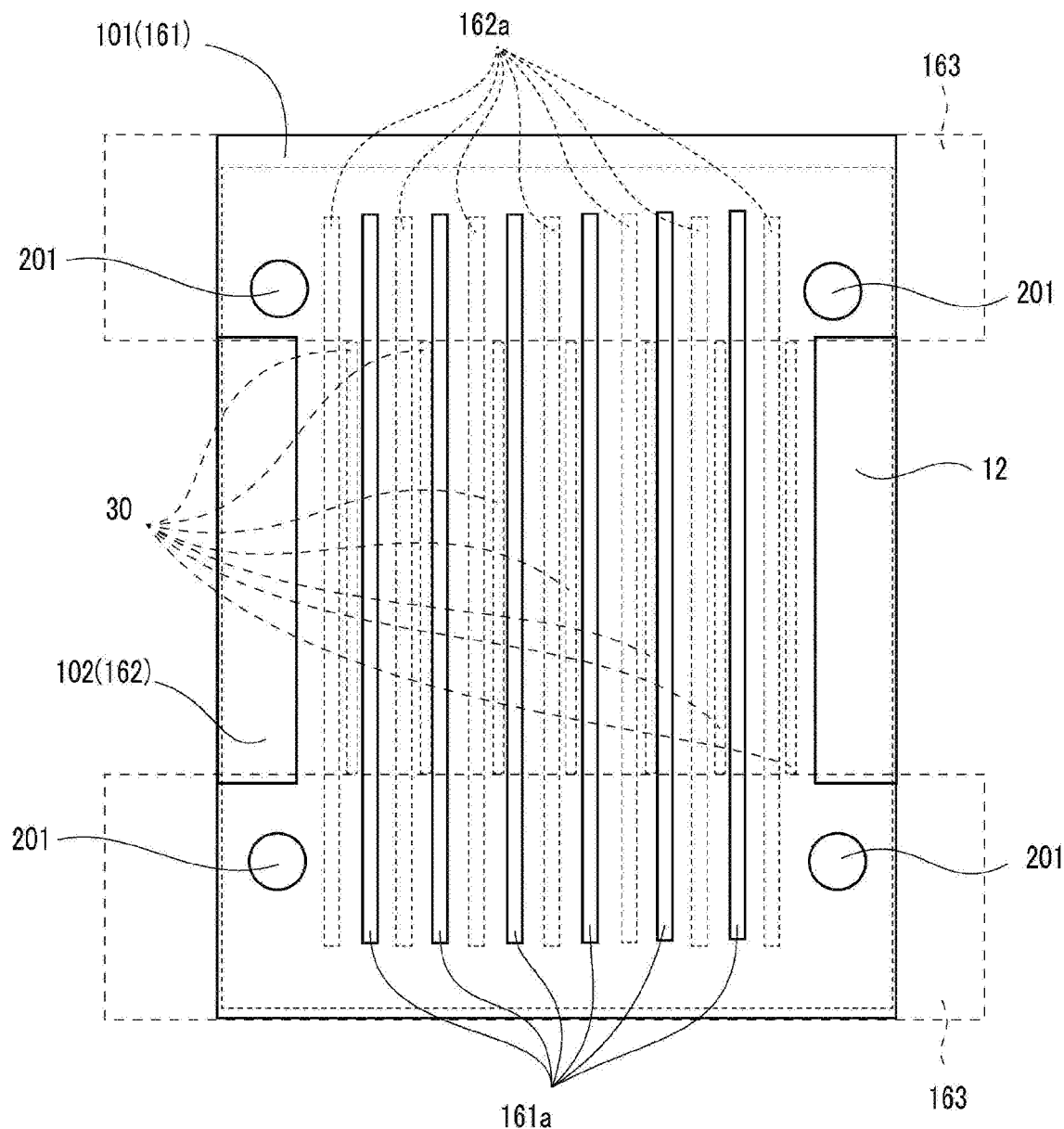
FIG. 9 is an illustration view showing an electrode lamination process.

Next, as schematically shown in FIG. 9, in an electrode lamination process, in the electrolyte membrane 12 in which the interconnector portions 30 are formed as described above, on a surface side opposite to the second diffusion electrode lamination body 102 laminated on the electrolyte membrane 12, the first diffusion electrode lamination body 101 is placed in a manner that the first electrode 161 is on a side of the electrolyte membrane 12. The first slits 161a which become the dividing grooves 17 are placed in alignment so as to be at predetermined positions with respect to the interconnector portions 30 (that is, the interconnector portions 30 are coated by the first electrode 161 (the protective layer 14) of the first diffusion electrode lamination body 101). At this time, the second diffusion electrode lamination body 102 and the electrolyte membrane 12 are positioned by matching the positions of the first positioning holes 201 and the second positioning holes 202, and thereby the positions of the first slits 161a and the second slits 162a can be easily arranged at the predetermined positions. Furthermore, when the electrolyte membrane 12 is laminated on the first diffusion electrode lamination body 101 in the electrolyte membrane lamination process, in the electrode lamination process, the second diffusion electrode lamination body 102 is laminated on the electrolyte membrane 12.

In addition, when the first diffusion electrode lamination body 101 is placed on the electrolyte membrane 12, sheets 163 made of polytetrafluoroethylene are sandwiched by being positioned at the places broken by the breakable lines 161c. Due to the sheets 163, the first diffusion electrode lamination body 101 and the second diffusion electrode lamination body 202 are prevented from sticking to each other at pre-set portions to be broken and the breaking can be easily performed.

[Side Edge Portion Removal Process]

Figure 10:
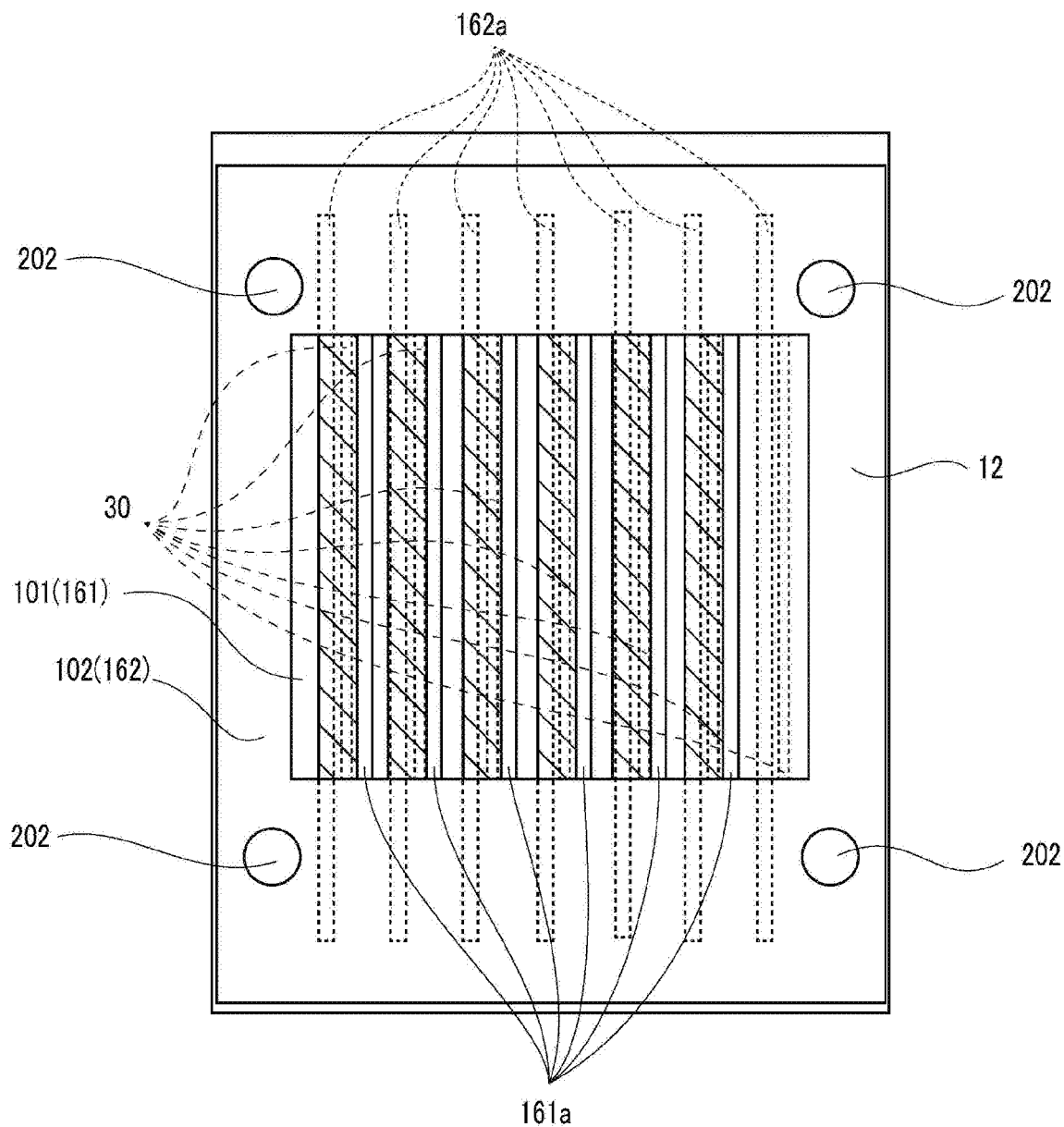
FIG. 10 is an illustration view showing a process for removing a side edge portion of a first electrode in a side edge portion removal process.

Next, as schematically shown in FIG. 10, in a side edge portion removal process, the sheets 163 are peeled off, the first electrode 161 of the first diffusion electrode lamination body 101 is broken along the breakable lines 161c, and unnecessary portions of the ends are removed. Thereby, both ends of the first slits 161a are also removed, and the first electrode 161 is divided into a plurality of unit cells.

Figure 11:
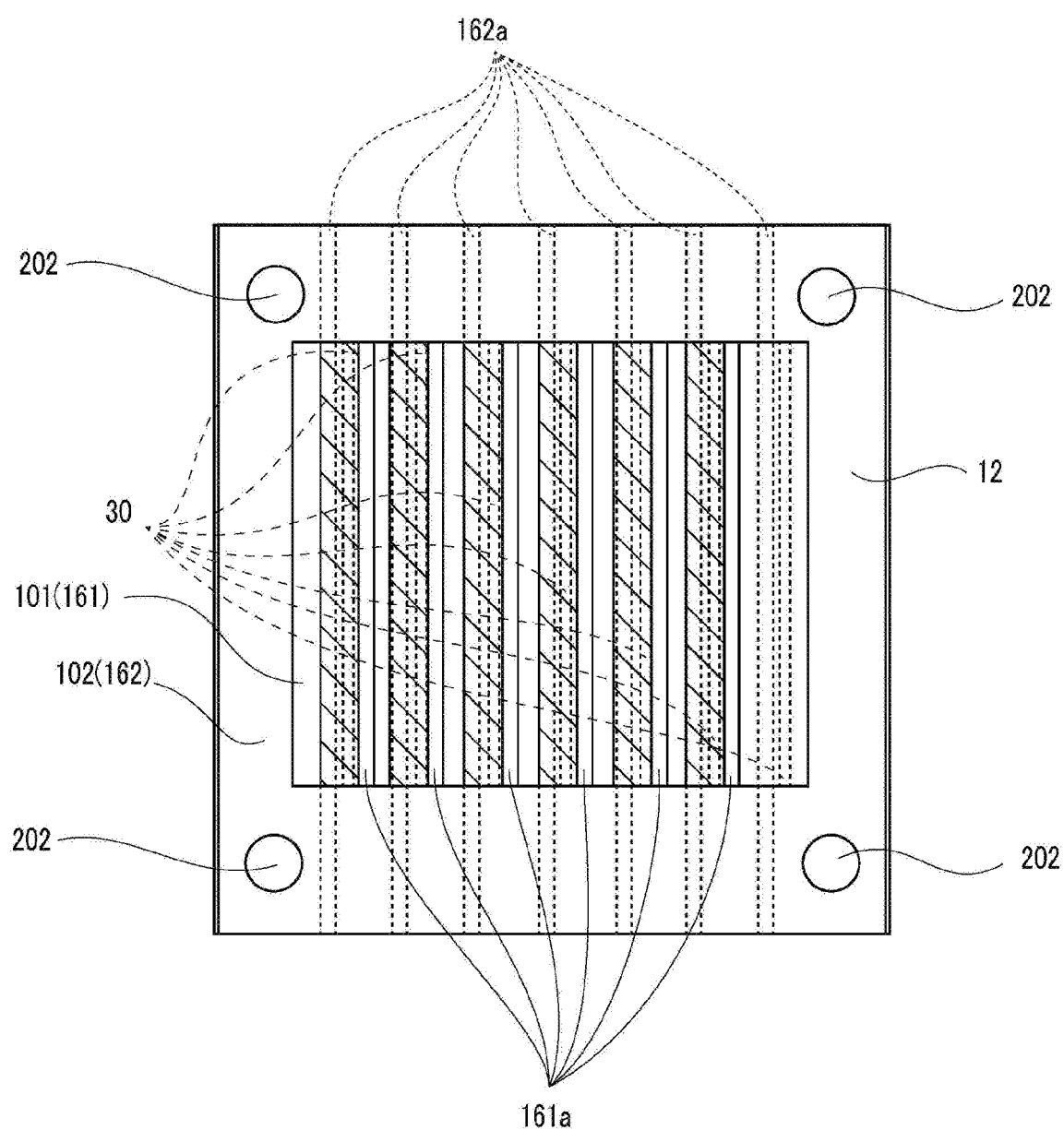
FIG. 11 is an illustration view showing a process for removing a side edge portion of a second electrode in the side edge portion removal process.

Next, as schematically shown in FIG. 11, end portions of the second electrode 162 are cut together with the electrolyte membrane 12. At this time, the cutting is performed by a cutter to remove the both end portions of the second slits 162a, and thereby the second electrode 162 is divided into a plurality of parts.

[Integration Process]

Figure 12:
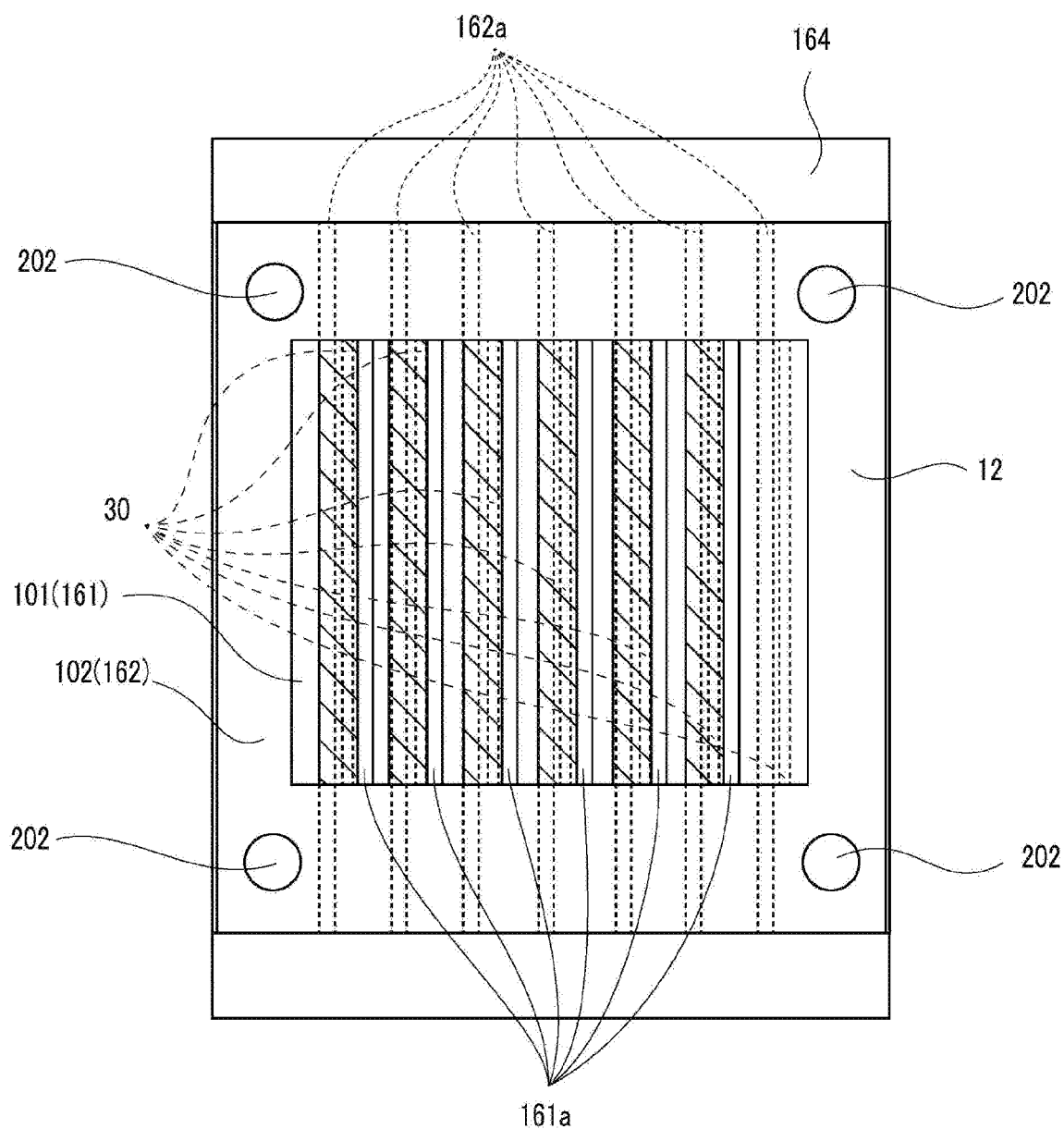
FIG. 12 is an illustration view showing a film coating process.

Then, as schematically shown in FIG. 12, in an integration process, the first electrode 161, the electrolyte membrane 12, and the second electrode 162 are sandwiched by insulation films 164, ends of the insulation films 164 are directly overlapped and bonded with each other, and the MEA 11 is manufactured.

Figure 3:
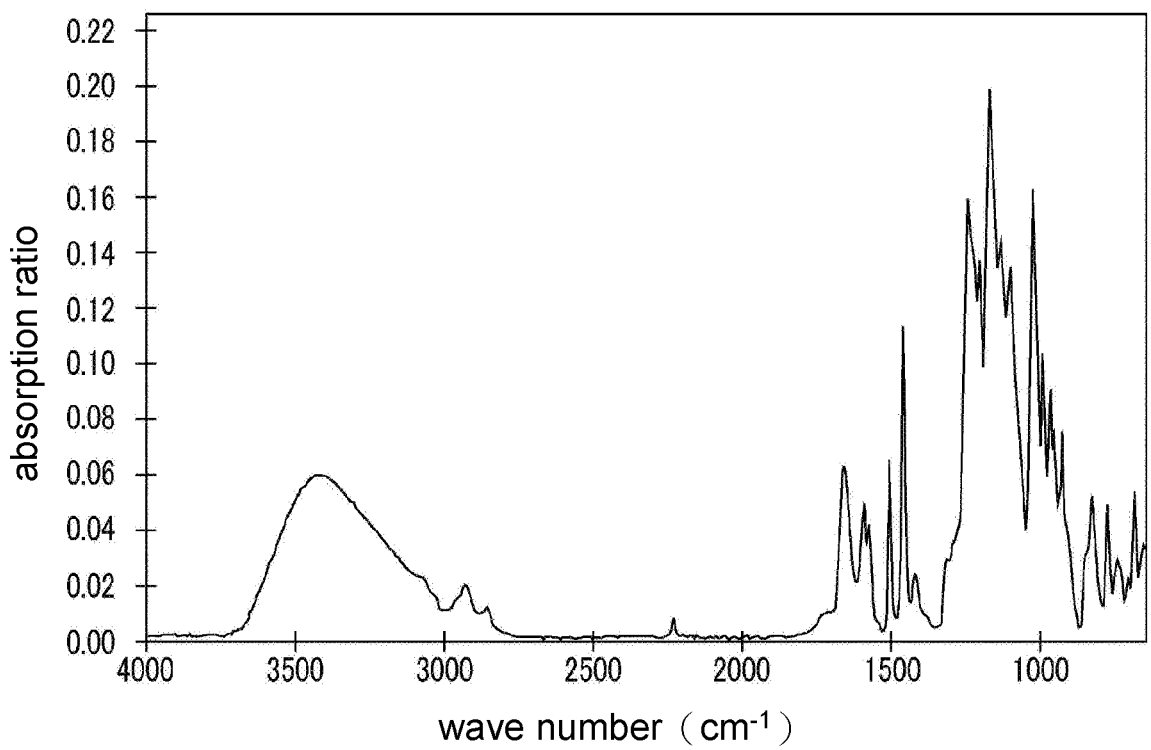
FIG. 3 is a view showing an FT-IR spectrum before heating aromatic polymer.
Figure 4:
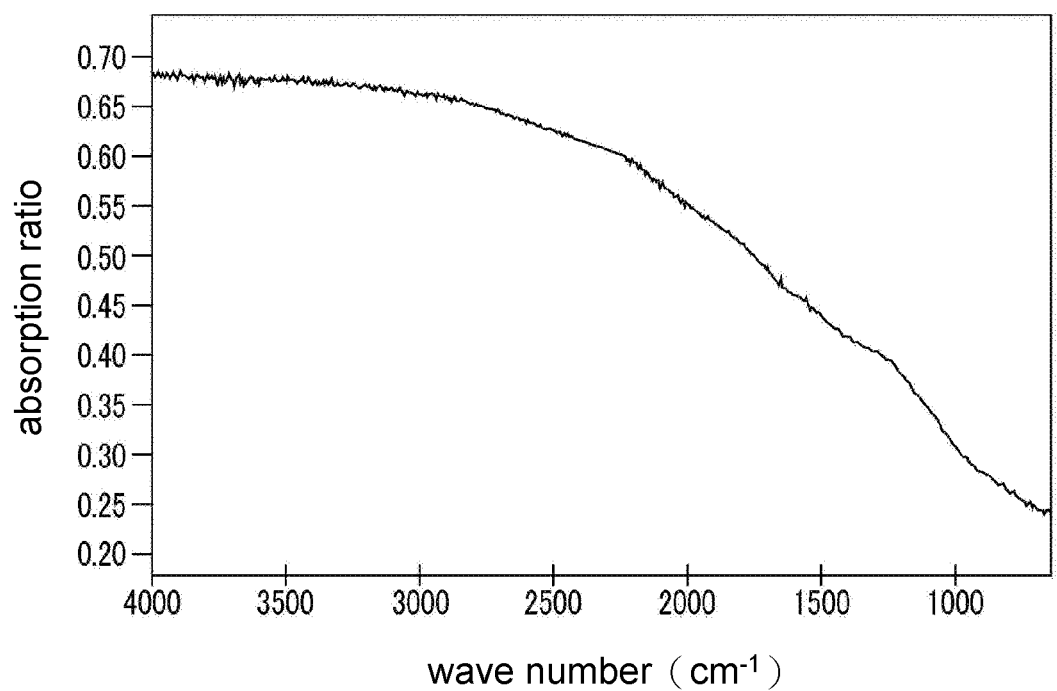
FIG. 4 is a view showing an FT-IR spectrum after heating the aromatic polymer.

Here, measurement results of infrared spectroscopy (FT-IR) and Raman spectroscopy before and after the heating of the interconnector portion places when the aromatic polymer is used as the proton conductive resin are shown. FIG. 3 shows an FT-IR spectrum before the heating and FIG. 4 shows an FT-IR spectrum after the heating. In FIG. 3 before the heating, absorption lines derived from bonds between atoms in the proton conductive resin are seen; in contrast, the absorption lines disappear in FIG. 4 after the heating. The reason is considered to be that the proton conductive resin is decomposed and changed into carbonaceous matter due to the heating.

Figure 5:
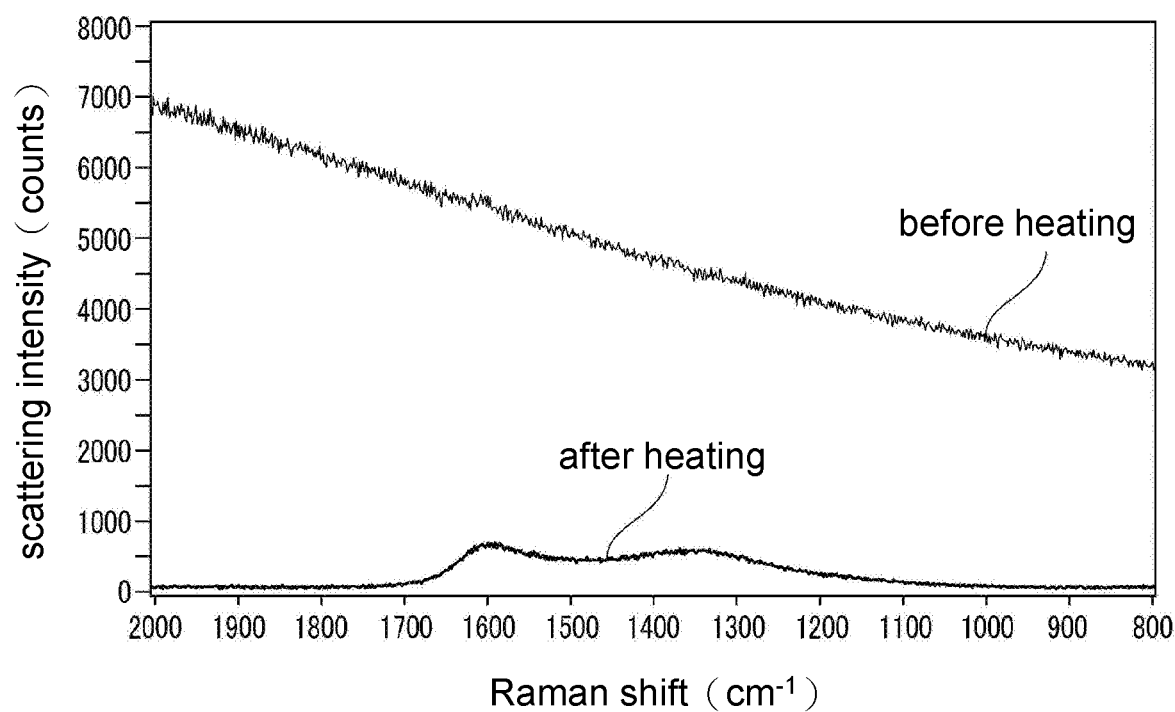
FIG. 5 is a view showing a Raman spectrum before and after heating the aromatic polymer.

On the other hand, in the measure result of the Raman spectroscopy, it is known that although no peak appears before the heating, peaks appear near 1350 $cm^{-1}$ and 1600 $cm^{-1}$ after the heating (FIG. 5). These are respectively considered to be D band and G band derived from carbonaceous materials, and it is considered that the places are changed into carbonaceous matter due to the heating.

By carbonizing the proton conductive resin by heating as described above, conductivity to a degree of a volume resistivity of about 0.1 Ω·mm can be easily applied to the places.

According to the manufacturing method of fuel cell of the embodiment, at the time of the IC formation process or the overlapping of the first electrode and the second electrode, because the first electrode and the second electrode of a plurality of unit cells are connected into one at the end portions of the first slits and the end portions of the second slits, the first electrode and the second electrode of each unit cell are not required to be arranged one by one at intervals, and after the first electrode and the second electrode are laminated sandwiching the electrolyte membrane, the end portions are cut off, and the first electrode and the second electrode are divided for each unit cell. Therefore, the fuel cell configured by a plurality of unit cells can be easily manufactured.

Furthermore, the first slits 161a may be formed before the first electrode is laminated on the electrolyte membrane, and the second slits 162a may be formed before the second electrode is laminated on the electrolyte membrane. Therefore, at the time of the electrolyte membrane lamination process in which the electrolyte membrane is laminated on any one of the first electrode and the second electrode, the slits may not be formed on the other one of the first electrode and the second electrode, and the slits may be formed on the other electrode until the other electrode is laminated on the electrolyte membrane.

In addition, in the embodiment, the first electrode 161 and the second electrode 162 are positioned by the first positioning holes 201 and the second positioning holes 202, and thus the first slits 161a and the second slits 162a can be easily positioned. In addition, in the side edge portion removal process, the sheets 163 are peeled off to remove the unnecessary portions of the ends of the first electrode 161 of the first diffusion electrode lamination body 101, and the first positioning holes 201 and the second positioning holes 202 are arranged in this removed range. Therefore, when the positioning of the membrane-electrode assembly MEA is performed later, the second positioning holes 202 do not get in the way and do not affect the membrane-electrode assembly MEA portion.

In addition, in the embodiment, the IC formation process is performed after the electrolyte membrane lamination process and before the second electrode lamination process. Thereby, the interconnector portions 30 can be formed corresponding to the positions of the first slits 161a, the first electrode 161 and the electrolyte membrane 12 are not required to overlap to make the first slits 161a and the interconnector portions 30 be at the predetermined positions, and the manufacturing becomes easy.

In addition, the manufacturing method of fuel cell of the embodiment includes an integration process in which the lamination body of the first electrode 161, the electrolyte membrane 12, and the second electrode 162 is sandwiched by two pieces of the insulation films 164 and the ends of the insulation films 164 are bonded, thereby achieving integration. According to the embodiment, the first electrode 161, the electrolyte membrane 12, and the second electrode 162 are unlikely to peel off from each other.

In addition, the integration process may be performed before the side edge portion removal process. By manufacturing in this way, the first electrode and the second electrode are integrated before being divided, and thus the first electrode and the second electrode can be easily positioned.

[1] The disclosure is a method for manufacturing a fuel cell (for example, a fuel cell 10 of the embodiment, the same applies hereinafter) including a first electrode (for example, a first electrode 161 of the embodiment, the same applies hereinafter) in which first slits (for example, first slits 161a of the embodiment, the same applies hereinafter) are formed and a second electrode (for example, a second electrode 162 of the embodiment, the same applies hereinafter) in which second slits (for example, second slits 162a of the embodiment, the same applies hereinafter) are formed, the method including:

a slit formation process in which slits are formed in any one of the first electrode and the second electrode;

an electrolyte membrane lamination process in which an electrolyte membrane (for example, an electrolyte membrane 12 of the embodiment, the same applies hereinafter) is laminated on the one electrode;

an IC formation process in which interconnector portions (for example, interconnector portions 30 of the embodiment, the same applies hereinafter) are formed on the electrolyte membrane;

an electrode lamination process in which the other one of the first electrode and the second electrode in which the slits are formed is laminated on the electrolyte membrane so that the electrolyte membrane is sandwiched between the first electrode and the second electrode; and a side edge portion removal process in which side edge portions of the first electrode and the second electrode are removed to divide the first electrode into a plurality of parts via the first slits and to divide the second electrode into a plurality of parts via the second slits.

According to the disclosure, the fuel cell configured by a plurality of the unit cells can be easily manufactured with no need to arrange the first electrode and the second electrode one by one at intervals.

[2] In addition, in the disclosure, preferably, positioning holes (for example, first positioning holes 201 and second positioning holes 202 of the embodiment) are arranged in the first electrode and the second electrode for positioning relative positions of the first slits and the second slits at predetermined positions.

According to the disclosure, the first slits and the second slits can be positioned easily.

[3] In addition, in the disclosure, preferably, the IC formation process is performed after the electrolyte membrane lamination process and before the second electrode lamination process.

According to the disclosure, the interconnector portions can be formed corresponding to the positions of the first slits or the second slits, and the manufacturing becomes easy with no need to overlap the first electrode or the second electrode with the electrolyte membrane to make the first slits or the second slits and the interconnector portions be at the predetermined positions.

[4] In addition, the disclosure includes an integration process in which a lamination body of the first electrode, the electrolyte membrane, and the second electrode is sandwiched by two pieces of films (for example, insulation films 164 of the embodiment), and ends of the films are bonded, thereby achieving integration.

According to the disclosure, the first electrode, the electrolyte membrane, and the second electrode are unlikely to peel off from each other.

What is claimed is:

1. A manufacturing method of fuel cell which is a method for manufacturing a fuel cell having a first electrode in which first slits are formed and a second electrode in which second slits are formed, comprising:
   a slit formation process in which slits are formed in any one of the first electrode and the second electrode;
   an electrolyte membrane lamination process in which an electrolyte membrane is laminated on the one electrode;
   an IC formation process in which interconnector portions are formed on the electrolyte membrane;
   an electrode lamination process in which the other one of the first electrode and the second electrode in which the slits are formed is laminated on the electrolyte membrane so that the electrolyte membrane is sandwiched between the first electrode and the second electrode; and
   a side edge portion removal process in which side edge portions of the first electrode and the second electrode are removed to divide the first electrode into a plurality of parts via the first slits and to divide the second electrode into a plurality of parts via the second slits.

2. The manufacturing method of fuel cell according to claim 1, wherein
   positioning holes for positioning relative positions of the first slits and the second slits at predetermined positions are arranged in the first electrode and the second electrode.

3. The manufacturing method of fuel cell according to claim 1, wherein
   the IC formation process is performed after the electrolyte membrane lamination process and before the second electrode lamination process.

4. The manufacturing method of fuel cell according to claim 2, wherein
   the IC formation process is performed after the electrolyte membrane lamination process and before the second electrode lamination process.

5. The manufacturing method of fuel cell according to claim 1, comprising
   an integration process in which a lamination body of the first electrode, the electrolyte membrane, the second electrode is sandwiched by two pieces of films and ends of the films are bonded, thereby achieving integration.

6. The manufacturing method of fuel cell according to claim 2, comprising
   an integration process in which a lamination body of the first electrode, the electrolyte membrane, the second electrode is sandwiched by two pieces of films and ends of the films are bonded, thereby achieving integration.

7. The manufacturing method of fuel cell according to claim 3, comprising
   an integration process in which a lamination body of the first electrode, the electrolyte membrane, the second electrode is sandwiched by two pieces of films and ends of the films are bonded, thereby achieving integration.

8. The manufacturing method of fuel cell according to claim 4, comprising
   an integration process in which a lamination body of the first electrode, the electrolyte membrane, the second electrode is sandwiched by two pieces of films and ends of the films are bonded, thereby achieving integration.

* * * * *